United States Patent
Komatsu et al.

(10) Patent No.: US 9,006,122 B2
(45) Date of Patent: Apr. 14, 2015

(54) DIELECTRIC CERAMIC AND DIELECTRIC FILTER HAVING THE SAME

(75) Inventors: Tsuyoshi Komatsu, Kirishima (JP);
Satoshi Toyoda, Kirishima (JP);
Hidehiro Takenoshita, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 13/997,192

(22) PCT Filed: Dec. 22, 2011

(86) PCT No.: PCT/JP2011/079767
§ 371 (c)(1),
(2), (4) Date: Jun. 21, 2013

(87) PCT Pub. No.: WO2012/086740
PCT Pub. Date: Jun. 28, 2012

(65) Prior Publication Data
US 2013/0293320 A1    Nov. 7, 2013

(30) Foreign Application Priority Data

Dec. 22, 2010  (JP) .................................. 2010-286109
May 26, 2011  (JP) .................................. 2011-118078

(51) Int. Cl.
*C04B 35/49*  (2006.01)
*C04B 35/46*  (2006.01)
(Continued)

(52) U.S. Cl.
CPC ............... *C04B 35/46* (2013.01); *C01G 25/006* (2013.01); *C01P 2006/80* (2013.01); *C04B 35/49* (2013.01);
(Continued)

(58) Field of Classification Search
CPC ........... H01P 1/20; C04B 35/46; C04B 35/49; C04B 35/457

USPC ........................................................ 501/134
See application file for complete search history.

(56) References Cited

U.S. PATENT DOCUMENTS 5,132,258  A     7/1992  Takahashi et al.
5,538,928  A *  7/1996  Park et al. ..................... 501/134
(Continued)

FOREIGN PATENT DOCUMENTS

JP    H3-28162  A    2/1991
JP    H4-106807  A    4/1992
(Continued)

OTHER PUBLICATIONS

International Search Report dated Mar. 27, 2012, issued for International Application No. PCT/JP2011/079767.
(Continued)

*Primary Examiner* — Karl Group
(74) *Attorney, Agent, or Firm* — Procopio, Cory, Hargreaves & Savitch LLP

(57) ABSTRACT

There are provided a dielectric ceramic having a high Qf value in a relative permittivity ∈r range of 35 to 45, and a small absolute value of a temperature coefficient τf which indicates change of the resonant frequency in a wide temperature range from a low temperature range to a high temperature range, and a dielectric filter having the dielectric ceramic. A dielectric ceramic includes: a main component, molar ratios α, β, and γ satisfying expressions of $0.240 \leq \alpha \leq 0.470$, $0.040 \leq \beta \leq 0.200$, $0.400 \leq \gamma \leq 0.650$, and $\alpha+\beta+\gamma=1$ when a composition formula of the main component is represented as $\alpha ZrO_2 \cdot \beta SnO_2 \cdot \gamma TiO_2$; and Mn, a content of Mn in terms of $MnO_2$ being greater than or equal to 0.01% by mass and less than 0.1% by mass with respect to 100% by mass of the main component.

10 Claims, 1 Drawing Sheet

(51) Int. Cl.
*C01G 25/00* (2006.01)
*H01B 3/12* (2006.01)
*H01P 1/20* (2006.01)
*C01G 23/047* (2006.01)

(52) U.S. Cl.
CPC . *C04B 2235/3225* (2013.01); *C04B 2235/3251* (2013.01); *C04B 2235/3256* (2013.01); *C04B 2235/3267* (2013.01); *C04B 2235/3281* (2013.01); *C04B 2235/3284* (2013.01); *C04B 2235/3293* (2013.01); *C04B 2235/3298* (2013.01); *C04B 2235/3418* (2013.01); *C04B 2235/447* (2013.01); *C04B 2235/727* (2013.01); *C04B 2235/77* (2013.01); *C04B 2235/85* (2013.01); *C04B 2235/96* (2013.01); *H01B 3/12* (2013.01); *H01P 1/20* (2013.01); *C01G 23/047* (2013.01); *C01P 2002/52* (2013.01); *C01P 2002/54* (2013.01); *C01P 2006/42* (2013.01)

(56) References Cited

U.S. PATENT DOCUMENTS

| | | | |
|---|---|---|---|
| 5,561,090 A * | 10/1996 | Park et al. | 501/134 |
| 5,766,502 A | 6/1998 | Hase et al. | |
| 5,843,860 A * | 12/1998 | Kim et al. | 501/134 |
| 6,756,335 B2 | 6/2004 | Okawa | |
| 7,399,723 B2 * | 7/2008 | Kanada et al. | 501/134 |
| 2002/0155942 A1 | 10/2002 | Okawa | |
| 2010/0062267 A1 | 3/2010 | Karmazin | |
| 2011/0236634 A1 | 9/2011 | Kawano et al. | |

FOREIGN PATENT DOCUMENTS

| | | |
|---|---|---|
| JP | H6-215626 A | 8/1994 |
| JP | H6-239663 A | 8/1994 |
| JP | S60-176968 A | 9/1995 |
| JP | H9-100159 A | 4/1997 |
| JP | 2003-34573 A | 2/2003 |
| JP | 2008-260657 A | 10/2008 |
| JP | 2010-69875 A | 4/2010 |
| WO | 2010/061842 A1 | 6/2010 |

OTHER PUBLICATIONS

Office Action dated Feb. 20, 2014, issued for Chinese Patent Application No. 201180061333.X.

* cited by examiner

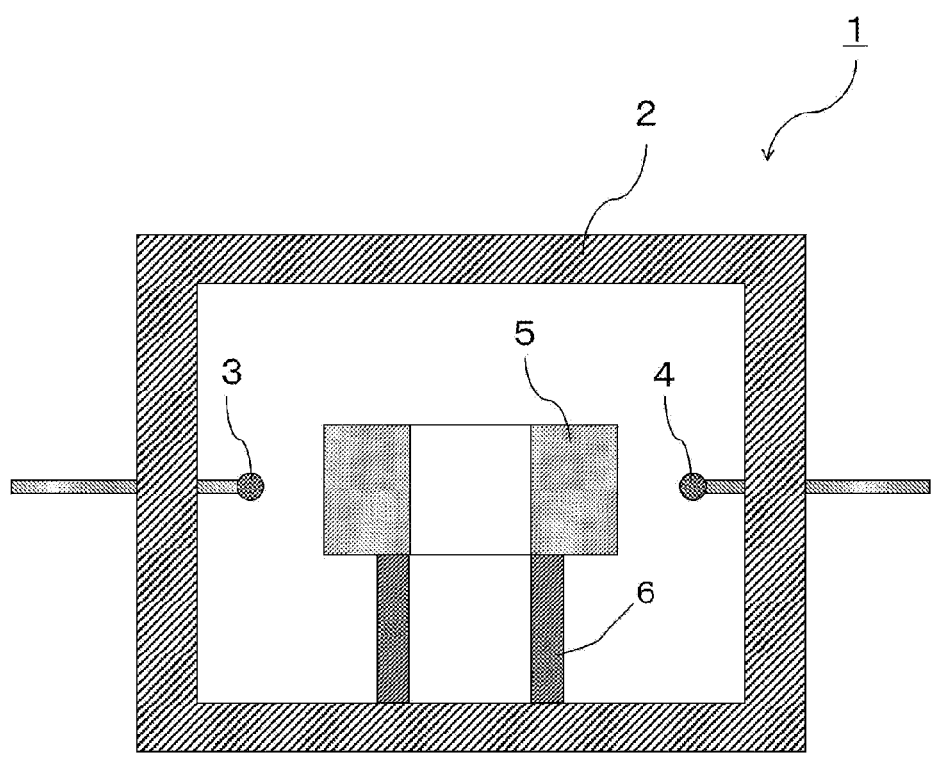

DIELECTRIC CERAMIC AND DIELECTRIC FILTER HAVING THE SAME

TECHNICAL FIELD

The present invention relates to a dielectric ceramic and a dielectric filter having the dielectric ceramic and, specifically, relates to a dielectric ceramic for use in a relay base station of a mobile phone or a BS antenna; and a dielectric filter having the dielectric ceramic.

BACKGROUND ART

A dielectric filter having a dielectric ceramic is incorporated into a relay base station of a mobile phone, a BS antenna or the like. As dielectric properties required for this dielectric ceramic, relative permittivities ∈r required for a dielectric ceramic are different because different properties are required for respective dielectric filters. In the respective relative permittivities ∈r, it is required that a Qf value (a value at 1 GHz among values which are measured at a frequency of 3.5 GHz to 4.5 GHz according to a dielectric rod resonator method (International Standard IEC 61338-1-3 (1999)) and satisfy the relationship of "(Q value)×(Measuring Frequency f)=Constant" generally established in a microwave dielectric) is high; and an absolute value of a temperature coefficient τf indicating the change of the resonant frequency with respect to the temperature is small.

As such a dielectric ceramic, for example, Patent Literature 1 discloses a microwave dielectric ceramic composition which has a composition represented as $(Zr_{1-x}Sn_x)TiO_4$ (wherein, $0.1 \leq X \leq 0.3$) as a main component; and contains 0.1 to 1.0 part by weight of $MnO_2$ with respect to 100 parts by weight of $(Zr_{1-x}Sn_x)TiO_4$.

CITATION LIST

Patent Literature

Patent Literature 1: Japanese Unexamined Patent Publication JP-A 6-215626 (1994)

SUMMARY OF INVENTION

Technical Problem

Patent Literature 1 describes that, when the addition amount of $MnO_2$ is less than 0.1 parts by weight, the sinterability is insufficient and thus the relative permittivity ∈r is reduced; and the dielectric properties can be improved by adding 0.1 parts by weight to 1.0 part by weight of $MnO_2$.

However, in a recent dielectric ceramic, it is required that the dielectric properties be further improved; and that the change of the resonant frequency be small particularly in a wide temperature range.

The invention has been made in order to solve the above-described problem, and an object thereof is to provide a dielectric ceramic having a high Qf value in a relative permittivity ∈r range of 35 to 45, and a small absolute value of a temperature coefficient τf which indicates change of the resonant frequency in a wide temperature range from a low temperature range to a high temperature range; and to provide a dielectric filter having the dielectric ceramic.

Solution to Problem

As a result of investigating various compositions of a dielectric ceramic, the present inventors have found that the dielectric properties can be further improved by a sintered compact which has specific molar ratios of Zr, Sn, and Ti; and contains the amount of $MnO_2$ disclosed in Patent Literature 1 in which the sinterability is insufficient.

The invention provides a dielectric ceramic including: a main component, molar ratios α, β, and γ satisfying expressions of $0.240 \leq \alpha \leq 0.470$, $0.040 \leq \beta \leq 0.200$, $0.400 \leq \gamma \leq 0.650$, and $\alpha+\beta+\gamma=1$ when a composition formula of the main component is represented as $\alpha ZrO_2 \cdot \beta SnO_2 \cdot \gamma TiO_2$; and Mn, a content of Mn in terms of $MnO_2$ being greater than or equal to 0.01% by mass and less than 0.1% by mass with respect to 100% by mass of the main component.

In addition, the invention provides a dielectric filter including: the dielectric ceramic having the above-described configuration; an input terminal that is electromagnetically coupled with the dielectric ceramic and to which an electric signal is inputted from outside; and an output terminal that is electromagnetically coupled with the dielectric ceramic and from which an electric signal corresponding to a resonant frequency of the dielectric ceramic is selectively outputted.

Advantageous Effects of Invention

According to the invention, a dielectric ceramic having satisfactory dielectric properties can be provided which has a relative permittivity ∈r of 35 to 45, a high Qf value, and a small change of resonant coefficient even in a place where a temperature difference is great.

According to the invention, a dielectric filter can be provided which has a relative permittivity ∈r of 35 to 45, a high Qf value, and a small change of resonant coefficient even in a place where a temperature difference is great. As a result, the high-reliability dielectric filter which is capable of stably maintaining satisfactory performance for a long period of time can be provided.

BRIEF DESCRIPTION OF DRAWINGS

FIGURE is a cross-sectional view illustrating an example of a dielectric filter according to an embodiment of the invention.

DESCRIPTION OF EMBODIMENTS

Hereinafter, an example of a dielectric ceramic according to an embodiment of the invention will be described.

The dielectric ceramic according to the embodiment includes a main component, molar ratios α, β, and γ satisfying expressions of $0.240 \leq \alpha \leq 0.470$, $0.040 \leq \beta \leq 0.200$, $0.400 \leq \gamma \leq 0.650$, and $\alpha+\beta+\gamma=1$ when a composition formula of the main component is represented as $\alpha ZrO_2 \cdot \beta SnO_2 \cdot \gamma TiO_2$; and Mn, a content of Mn in terms of $MnO_2$ being greater than or equal to 0.01% by mass and less than 0.1% by mass with respect to 100% by mass of the main component.

The main component of the dielectric ceramic according to the embodiment is formed of oxides of Zr, Sn, and Ti, and a total content including a content of Zr in terms of $ZrO_2$, a content of Sn in terms of $SnO_2$, and a content of Ti in terms of $TiO_2$ is greater than or equal to 97.5% by mass with respect to 100% by mass of all the components constituting the dielectric ceramic. Examples of components included in the dielectric ceramic other than Zr, Sn, and Ti include Hf, Si, Cr, Fe, Ni, Cu, Zn, Nb, P, Mo, Y, and Bi.

In the dielectric ceramic according to the embodiment, when a composition formula of the main component is represented as $\alpha ZrO_2 \cdot \beta SnO_2 \cdot \gamma TiO_2$, molar ratios α, β, and γ satisfy the expressions of $0.240 \leq \alpha \leq 0.470$, $0.040 \leq \beta \leq 0.200$, $0.400 \leq \gamma \leq 0.650$, and $\alpha+\beta+\gamma=1$, and a content of Mn is greater than or equal to 0.01% by mass and less than 0.1% by mass in terms of $MnO_2$ with respect to 100% by mass of the main component. As a result, the dielectric ceramic can obtain satisfactory dielectric properties. The reason why the dielectric ceramic can obtain satisfactory dielectric properties is not clear, but is considered to be that surplus oxygen generated due to the valence modification of Mn oxide is supplied to oxygen defects generated in a structure of a dielectric ceramic during firing; and as a result, oxygen defects present in the dielectric ceramic after firing can be reduced and the sinterability is increased.

As specific dielectric properties, a relative permittivity $\in r$ can be made to be 35 to 45; and a Qf value can be made to be greater than or equal to 45000. In addition, when a resonant frequency is measured in a temperature range of $-40°$ C. to $85°$ C., absolute values of temperature coefficients $\tau f$ of resonant frequencies in a range of $-40°$ C. to $20°$ C. (hereinafter, also referred to as "low temperature range") and a range of $20°$ C. to $85°$ C. (hereinafter, also referred to as "high temperature range"), which are calculated based on a resonant frequency at $20°$ C., can be made to be less than or equal to 10 ppm/$°$ C.

Here, the relative permittivity $\in r$ is a value measured at a frequency of 3.5 GHz to 4.5 GHz based on a dielectric rod resonator method (International Standard IEC 61338-1-3 (1999)). In addition, the Qf value is a value at 1 GHz which satisfies the relationship "(Q value)×(Measuring Frequency f)=Constant" generally established in a microwave dielectric.

When the content of Mn in terms of $MnO_2$ is less than 0.01% by mass with respect to 100% by mass of the main component, the addition amount is too small. Therefore, effects of reducing oxygen defects and increasing the sinterability during firing are low. When the content of Mn in terms of $MnO_2$ is greater than or equal to 0.1% by mass with respect to 100% by mass of the main component, the dielectric properties such as the relative permittivity $\in r$, the Qf value, and the temperature coefficient $\tau f$ of the resonant frequency deteriorate. The reason is not clear, but is considered to be that the amount of a Mn component present in a grain boundary is too great and thus the dielectric properties are affected.

In addition, in the dielectric ceramic according to the embodiment, when the molar ratios $\alpha$, $\beta$, and $\gamma$ of the composition formula of the main component satisfy the expressions of $0.300 \leq \alpha \leq 0.440$, $0.080 \leq \beta \leq 0.150$, $0.420 \leq \gamma \leq 0.600$, and $\alpha+\beta+\gamma=1$, and a content of Mn is greater than or equal to 0.02% by mass and less than or equal to 0.07% by mass in terms of $MnO_2$ with respect to 100% by mass of the main component, more satisfactory dielectric properties can be obtained. Specifically, the relative permittivity $\in r$ can be made to be 36.5 to 43; and the Qf value can be made to be greater than or equal to 50000. In addition, the absolute values of the temperature coefficients $\tau f$ of resonant frequencies in the low temperature range and the high temperature range can be made to be less than or equal to 6 ppm/$°$ C.

In addition, in the dielectric ceramic according to the embodiment, it is preferable that a compound formed of oxides containing Mn, Zr, and Ti is present in a grain boundary. Examples of the compound formed of oxides containing Mn, Zr, and Ti include $Mn_{0.33}Zr_{0.33}Ti_{0.33}O_{1.67}$. When such a compound is present in a boundary (hereinafter, referred to as "grain boundary") of crystal grains (hereinafter referred to as "main crystal grains") of the main component formed of oxides of Zr, Sn, and Ti, the Qf value can be improved. The reason why the Qf value is improved is not clear, but is considered to be that the compound formed of oxides containing Mn, Zr, and Ti is present in the grain boundary, thereby suppressing the grain growth of the main crystal grains and homogenizing the structure. In order to make the compound formed of oxides containing Mn, Zr, and Ti be present in the grain boundary as described above, it is only necessary that a Mn component be added to calcined powder synthesized from the main component by calcination.

Whether or not the compound formed of oxides containing Mn, Zr, and Ti is present in the grain boundary can be confirmed according to the following method. For example, the confirmation is possible with a method in which a surface of the dielectric ceramic is irradiated with $CuK\alpha$ rays using an X-ray diffractometer (D8 ADVANCE, manufactured by Bruker AXS Inc.); an angle difference ($2\theta$) between a diffraction direction and an incident direction of the $CuK\alpha$ rays and an X-ray diffraction chart, which is a result of scanning an X-ray diffraction intensity with a detector, are obtained; and the identification is performed based on the JCPDS card.

In addition, it is preferable that the dielectric ceramic according to the embodiment includes oxides of Si, Nb, Zn, and Cu; and a total content of Si, Nb, Zn, and Cu in terms of $SiO_2$, $Nb_2O_5$, ZnO, and CuO be less than or equal to 0.3% by mass (not including 0% by mass) with respect to 100% by mass of the main component. As a result, a difference between temperature coefficients $\tau f$ of the resonant frequency in the low temperature range and the high temperature range can be made to be small; and a dielectric ceramic is provided which has a small difference in dielectric properties between a low ambient temperature region and a high ambient temperature region and can be desirably used even in a region where an ambient temperature difference is great.

In addition, in the dielectric ceramic according to the embodiment, it is preferable that a ceramic density is greater than or equal to 5.16 g/cm$^3$. In this way, when the ceramic density of the dielectric ceramic is greater than or equal to 5.16 g/cm$^3$, the dielectric ceramic having small micropores on a surface thereof can be provided. Therefore, even in a high humidity environment, the change of the Qf value by moisture being absorbed can be made to be small. In addition, when the ceramic density is greater than or equal to 5.16 g/cm$^3$, a dielectric ceramic is provided which has mechanical properties in which a small amount of defects or cracks are generated during a grinding process after firing. The ceramic density may be measured according to JIS R1634-1998.

In addition, in the dielectric ceramic according to the embodiment, it is preferable that a content of P in terms of $P_2O_5$ is less than or equal to 0.7% by mass (not including 0% by mass) with respect to 100% by mass of the main component. As described above, when the content of P in terms of $P_2O_5$ is less than or equal to 0.7% by mass (not including 0% by mass), mechanical properties can be further improved compared to a dielectric ceramic which has the same composition other than P and does not contain P or a dielectric ceramic which has the same composition other than P and contains greater than 0.7% by mass of P in terms of $P_2O_5$. Here, the reason why mechanical properties are improved is considered to be that, when the content of P in terms of $P_2O_5$ is less than or equal to 0.7% by mass (not including 0% by mass) in a firing process of the dielectric ceramic, the growth of the main crystal grains is suppressed, the grain size is reduced, and the structure is further densified.

Since mechanical properties can be improved, defects or cracks which are generated during a grinding process after firing and during the manufacturing process or are generated by stress applied when being mounted onto a placing table as a filter can be reduced. The content of P in terms of $P_2O_5$ is more preferably 0.1% by mass to 0.5% by mass. With this content, a three-point bending strength indicating mechanical properties can be made to be greater than or equal to 180 MPa. The three-point bending strength may be measured according to JIS R 1601-1995.

In addition, it is preferable that the dielectric ceramic according to the embodiment includes at least one of oxides of Mo, Y, and Bi; and a total content of Mo, Y, and Bi in terms of $MoO_3$, $Y_2O_3$, and $Bi_2O_3$ is less than or equal to 0.1% by mass (not including 0% by mass) with respect to 100% by mass of the main component. As a result, the Qf value can be further improved.

In addition, it is preferable that the dielectric ceramic according to the embodiment includes a crystal phase of $Ti_{0.8}Sn_{0.2}O_2$. As a result, the relative permittivity can be improved. The crystal phase of $Ti_{0.8}Sn_{0.2}O_2$ can be confirmed by irradiating a surface of the dielectric ceramic with $CuK\alpha$ rays using an X-ray diffractometer (D8 ADVANCE, manufactured by Bruker AXS Inc.); obtaining an angle difference ($2\theta$) between a diffraction direction and an incident direction of the $CuK\alpha$ rays and an X-ray diffraction chart, which is a result of scanning an X-ray diffraction intensity with a detector; and performing the identification based on the JCPDS card. Alternatively, the confirmation is possible with an electron diffraction method or the like using a TEM.

In addition, contents of respective components included in the dielectric ceramic according to the embodiment can be obtained by crushing a part of the dielectric ceramic to obtain powder; weighing a predetermined amount of the obtained powder and performing a pretreatment of dissolving the same in hydrochloric acid or the like; measuring the resultant using an ICP (Inductively Coupled Plasma) emission spectrophotometric analyzer (ICPS-8100, manufactured by Shimadzu Corporation) according to a calibration curve method or an internal standard method using yttrium as an internal standard substance; and calculating the contents of metals of the obtained respective components in terms of oxides. In addition, the respective molecular weights are calculated in terms of mole using the obtained values of $ZrO_2$, $SnO_2$, $TiO_2$, and molar ratios can be calculated using these values of mole.

Next, an example of a dielectric filter having the dielectric ceramic according to the embodiment will be described based on FIGURE which is a cross-sectional view thereof.

As illustrated in FIGURE, a TE mode dielectric filter 1 according to the embodiment includes a metal case 2, an input terminal 3, an output terminal 4, a dielectric ceramic 5, and a placing table 6. The metal case 2 is formed of a light-weight metal such as aluminum. The input terminal 3 and the output terminal 4 are provided on both sides facing each other in an internal wall of the metal case 2. In addition, the dielectric ceramic 5 is configured by the dielectric ceramic according to the embodiment. The dielectric ceramic 5 is disposed between the input terminal 3 and the output terminal 4 and is electromagnetically coupled with the input terminal 3 and the output terminal 4, respectively. In such a dielectric filter 1, an electric signal is inputted to the input terminal 3 from outside, a magnetic field is generated in the metal case 2, the dielectric ceramic 5 resonates at a specific frequency, and an electric signal corresponding to this resonant frequency is outputted from the output terminal 4. In this way, the dielectric filter 1 can selectively output an electric signal corresponding to a resonant frequency of the dielectric ceramic 5.

The mode is not limited to the TE mode, and may be a TM mode, a TEM mode, or a multiplex mode. In addition, the configuration of the dielectric filter 1 is not limited to the above-described configuration. The input terminal 3 and the output terminal 4 may be directly provided on the dielectric ceramic 5. In addition, the dielectric ceramic 5 is a resonant medium which has a predetermined shape and is configured by the dielectric ceramic according to the embodiment. The shape only has to be a cylindrical shape, a cuboid shape, a cubic shape, a plate-like shape, a disc shape, a columnar shape, a prism shape, or other three-dimensional shapes capable of resonating. In addition, it is preferable that the frequency of a high-frequency signal to be inputted is approximately 500 MHz to 500 GHz; and the resonant frequency is approximately 500 MHz to 10 GHz.

When the dielectric filter 1 according to the embodiment includes the dielectric ceramic according to the embodiment, the relative permittivity $\in$r is 35 to 45, the Qf value is high at 45000 or higher, and the absolute value of the temperature coefficient $\tau$f indicating the change of the resonant frequency in the low temperature range and the high temperature range can be made to be less than or equal to 10 ppm/° C. and the change of the resonant frequency is small even in a place where an ambient temperature change is great. As a result, the high-reliability dielectric filter 1 which is capable of stably maintaining satisfactory performance for a long period of time can be provided.

Next, an example of a manufacturing method of the dielectric ceramic according to the embodiment will be described.

First, as starting materials, zirconium oxide ($ZrO_2$), tin oxide ($SnO_2$) and titanium oxide ($TiO_2$) having high purity which are the main component, and manganese carbonate ($MnCO_3$) are respectively weighed and prepared so as to obtain a desired ratio and are put into a ball mill using zirconia balls or the like with pure water, followed by wet blending and crushing for 1 hour to 50 hours until an average particle size thereof is less than or equal to 2 μm. As a result, a primary raw material is obtained. The average particle size after wet blending and crushing is measured using, for example, a Microtrac (9320-X100, manufactured by Nikkiso Co., Ltd.) according to a laser diffraction scattering method.

Next, the primary raw material is dried and then is calcined at a temperature of higher than 1100° C. and lower than or equal to 1300° C. for 1 hour to 10 hours, followed by wet crushing using a ball mill until an average particle size is less than or equal to 2 μm, preferably, less than or equal to 1 μm. Here, when the calcination temperature is lower than or equal to 1100° C., sufficient synthesis is not performed, and when the calcination temperature is higher than 1300° C., a calcined material is too hard and thus is difficult to crush.

After wet crushing, slurry is put into a stainless steel container, followed by drying and filtration through a mesh to obtain calcined powder. Manganese carbonate ($MnCO_3$) may be added to the starting material before calcination as described above, or may be added to calcined powder after calcination. When manganese carbonate is added after calcination, the compound formed of oxides containing Mn, Zr, and Ti can be made to be present in the grain boundary.

In addition, in order to further improve the difference between temperature coefficients $\tau$f of the resonant coefficient in the low temperature range and the high temperature range, silicon oxide ($SiO_2$), niobium oxide ($Nb_2O_5$), zinc oxide (ZnO), and copper oxide (CuO) may be weighed and added to the starting materials or the calcined powder after calcination such that a total content thereof in the dielectric ceramic is less than or equal to 0.3% by mass (not including 0% by mass) with respect to 100% by mass in total of zirconium oxide ($ZrO_2$), tin oxide ($SnO_2$), and titanium oxide ($TiO_2$) which are the main component.

In addition, in order to obtain more satisfactory mechanical properties, $P_2O_5$, $NH_4H_2PO_4$, or the like may be weighed and prepared as a P source such that a content of P in terms of $P_2O_5$ in the dielectric ceramic is less than or equal to 0.7% by mass (not including 0% by mass) with respect to 100% by mass of the main component, and may be added to the starting materials or the calcined powder after calcination.

In addition, in order to further improve the Qf value, at least one of molybdenum oxide ($MoO_3$), yttrium oxide ($Y_2O_3$), and bismuth oxide ($Bi_2O_3$) may be weighed and added to the starting materials or the calcined powder after calcination such that a total content thereof in the dielectric ceramic is less than or equal to 0.1% by mass (not including 0% by mass) with respect to 100% by mass in total of zirconium oxide ($ZrO_2$), tin oxide ($SnO_2$), and titanium oxide ($TiO_2$) which are the main component.

In addition, in order to improve the relative permittivity, calcination may be performed in a calcination temperature range of higher than 1100° C., which is a low temperature side, and lower than or equal to 1150° C. to precipitate a crystal phase of $Ti_{0.8}Sn_{0.2}O_2$ in the dielectric ceramic. In addition, $Ti_{0.8}Sn_{0.2}O_2$ generated by heat treatment using titanium oxide ($TiO_2$) and tin oxide ($SnO_2$) may be added to the starting materials or the calcined powder after calcination.

Next, a predetermined amount of pure water is added to the calcined powder, followed by wet blending using a ball mill or the like for a predetermined amount of time. A binder is added thereto and mixed, followed by spray granulation using a spray dryer to obtain a secondary raw material. Then, this secondary raw material is molded into a compact having a predetermined shape using a die press molding method, a cold isostatic press molding method, an extrusion molding method, or the like. The obtained compact is left to stand and fired in the atmosphere at a maximum temperature of 1430° C. or higher and 1530° C. or lower for 30 minutes to 10 hours, followed by, as necessary, a grinding process. As a result, the dielectric ceramic according to the embodiment can be obtained. When the temperature rise rate is set to be less than or equal to 150° C./hr until the maximum temperature during firing, the ceramic density can be made to be greater than or equal to 5.16 g/cm$^3$. It is more preferable that the temperature rise rate is greater than or equal to 50° C./hr and less than or equal to 150° C./hr.

The dielectric ceramic according to the embodiment, which is manufactured according to the above-described manufacturing method, can be used for a filter that selectively outputs an electric signal corresponding to a resonant frequency of the dielectric ceramic. In addition, the dielectric ceramic according to the embodiment can be used for an MIC (Monolithic IC) dielectric substrate, a dielectric waveguide, or a stacked ceramic capacitor as well as a resonator.

Example 1

When a composition formula of the main component is represented as $\alpha ZrO_2 \cdot \beta SnO_2 \cdot \gamma TiO_2$, values of molar ratios $\alpha$, $\beta$, and $\gamma$ and the addition amount of $MnO_2$ were changed to prepare various samples, and the relative permittivity ∈r, the Qf value, and the temperature coefficient τr of the resonant frequency of each sample were measured. A manufacturing method and a method of measuring properties will be described below in detail.

As the main component for starting materials, the respective powders of zirconium oxide ($ZrO_2$), tin oxide ($SnO_2$), and titanium oxide ($TiO_2$) having a purity of 99.5% or higher were prepared. In addition, powder of manganese carbonate ($MnCO_3$) having a purity of 99.5% or higher was prepared. Next, the main component and Mn in the obtained dielectric ceramic were weighed such that the molar ratios of the main component were as shown in Table 1; and the content of Mn in terms of $MnO_2$ was as shown in Table 1 with respect to 100% by mass of the main component. The weighed zirconium oxide, tin oxide, titanium oxide, and manganese carbonate were put into a ball mill using zirconium balls or the like with pure water, followed by wet blending and crushing until an average particle size was less than or equal to 2 μm. As a result, a primary raw material was obtained.

Next, the primary raw material was dried and then was calcined at a temperature of 1200° C. for 2 hours, followed by wet blending and crushing using a ball mill until an average particle size became 1 μm. After wet blending and crushing, slurry was put into a stainless steel container, followed by drying and filtration through a mesh to obtain calcined powder. Next, pure water was added to the calcined powder, followed by wet blending using a ball mill with zirconia balls or the like. Next, 5% by mass of binder was further added thereto and mixed, followed by spray granulation using a spray dryer to obtain a secondary raw material.

Next, this secondary raw material was molded into a cylindrical compact having a diameter of 20 mm and a height of 15 mm using a die press molding method. The obtained compact was left to stand in the atmosphere at a calcination temperature of 1450° C. for 2 hours. As a result, samples No. 1 to 41 of the dielectric ceramic were obtained. After firing, upper and lower surfaces and a part of side surfaces of each of these samples were subjected to a grinding process, followed by washing with ultrasonic waves in acetone.

Sample No. 34 was prepared with the same processes as those of the above-described manufacturing method, except that manganese carbonate was not added to the starting materials.

The dielectric properties of these samples No. 1 to 41 were measured. As the dielectric properties, the relative permittivity ∈r and the Qf value were measured at a frequency of 3.5 GHz to 4.5 GHz according to a dielectric rod resonator method (International Standard IEC 61338-1-3 (1999)). The Qf value was obtained as a value at 1 GHz which satisfies the relationship "(Q value)×(Measuring Frequency f)=Constant" generally established in a microwave dielectric. In addition, the resonant frequency was measured in the temperature range of −40° C. to 85° C., and the temperature coefficients τf of the resonant frequency in the low temperature range (−40° C. to 20° C.) and the high temperature range (20° C. to 85° C.) were calculated based on the resonant frequency at 20° C. The results thereof are shown in Table 1.

A part of each sample was crushed to obtain powder; the obtained powder was dissolved in a solution such as hydrochloric acid; the resultant was analyzed using an ICP (Inductively Coupled Plasma) emission spectrophotometric analyzer (ICPS-8100, manufactured by Shimadzu Corporation); the contents of metals of the obtained respective components in terms of oxides were obtained; and molar ratios were obtained using the respective molecular weights thereof. The molar ratios are shown in Table 1. In addition, regarding the content in terms of $MnO_2$, values with respect to 100% by mass of the main component are shown in Table 1.

TABLE 1

| Sample No. | ZrO$_2$ α Molar Ratio | SnO$_2$ β Molar Ratio | TiO$_2$ γ Molar Ratio | MnO$_2$ % by Mass | Relative Permittivity ∈r | Quality Coefficient Qf | Low Temperature Range τf *1 ppm/° C. | High Temperature Range τf *2 ppm/° C. |
|---|---|---|---|---|---|---|---|---|
| 1 | 0.230 | 0.120 | 0.650 | 0.05 | 34.7 | 61800 | −12.3 | −11.8 |
| 2 | 0.240 | 0.120 | 0.640 | 0.05 | 35.1 | 60900 | −9.8 | −9.5 |
| 3 | 0.270 | 0.120 | 0.610 | 0.05 | 36.1 | 59500 | −6.9 | −6.5 |
| 4 | 0.290 | 0.120 | 0.590 | 0.05 | 36.4 | 55200 | −5.9 | −5.4 |
| 5 | 0.300 | 0.120 | 0.580 | 0.05 | 36.9 | 53200 | −5.7 | −5.2 |
| 6 | 0.350 | 0.120 | 0.530 | 0.05 | 36.4 | 56700 | −3.7 | −3.2 |
| 7 | 0.390 | 0.120 | 0.490 | 0.05 | 39.1 | 58600 | −2.0 | −1.5 |
| 8 | 0.430 | 0.120 | 0.450 | 0.05 | 39.3 | 57400 | −1.0 | −0.6 |
| 9 | 0.450 | 0.120 | 0.430 | 0.05 | 39.4 | 47500 | −0.8 | −0.4 |
| 10 | 0.470 | 0.120 | 0.410 | 0.05 | 41.5 | 45300 | −0.8 | −0.5 |
| 11 | 0.480 | 0.120 | 0.400 | 0.05 | 43.1 | 44800 | 0.1 | 0.5 |
| 12 | 0.320 | 0.030 | 0.650 | 0.05 | 45.2 | 43500 | 13.6 | 13.1 |
| 13 | 0.320 | 0.040 | 0.640 | 0.05 | 43.1 | 45100 | 9.3 | 8.9 |
| 14 | 0.310 | 0.060 | 0.630 | 0.05 | 42.3 | 48000 | 7.0 | 7.4 |
| 15 | 0.310 | 0.080 | 0.610 | 0.05 | 41.6 | 49800 | 3.0 | 3.4 |
| 16 | 0.300 | 0.100 | 0.600 | 0.05 | 40.8 | 56400 | 1.5 | 1.1 |
| 17 | 0.300 | 0.110 | 0.590 | 0.05 | 38.4 | 56000 | −2.0 | −1.6 |
| 18 | 0.300 | 0.120 | 0.580 | 0.05 | 36.9 | 57000 | −5.7 | −5.4 |
| 19 | 0.300 | 0.150 | 0.550 | 0.05 | 36.5 | 60000 | −5.9 | −5.5 |
| 20 | 0.300 | 0.170 | 0.530 | 0.05 | 35.7 | 62000 | −8.5 | −8.2 |
| 21 | 0.300 | 0.200 | 0.500 | 0.05 | 35.2 | 65200 | −9.7 | −9.2 |
| 22 | 0.290 | 0.210 | 0.500 | 0.05 | 34.8 | 65500 | −13.1 | −12.5 |
| 23 | 0.460 | 0.150 | 0.390 | 0.05 | 34.3 | 57800 | −0.8 | −0.6 |
| 24 | 0.450 | 0.150 | 0.400 | 0.05 | 35.8 | 56500 | −3.0 | −2.8 |
| 25 | 0.440 | 0.140 | 0.420 | 0.05 | 37.0 | 54000 | −1.0 | −0.8 |
| 26 | 0.440 | 0.110 | 0.450 | 0.05 | 38.5 | 52000 | 1.0 | 1.2 |
| 27 | 0.430 | 0.100 | 0.470 | 0.05 | 40.0 | 50200 | 1.2 | 0.9 |
| 28 | 0.400 | 0.100 | 0.500 | 0.05 | 41.0 | 50500 | 3.0 | 3.3 |
| 29 | 0.350 | 0.100 | 0.550 | 0.05 | 42.4 | 50300 | 4.0 | 4.3 |
| 30 | 0.320 | 0.080 | 0.600 | 0.05 | 42.7 | 50100 | 5.5 | 5.8 |
| 31 | 0.310 | 0.070 | 0.620 | 0.05 | 43.1 | 48000 | 6.7 | 7.0 |
| 32 | 0.300 | 0.050 | 0.650 | 0.05 | 44.8 | 45200 | 8.5 | 8.1 |
| 33 | 0.300 | 0.040 | 0.660 | 0.05 | 45.5 | 43100 | 10.9 | 10.5 |
| 34 | 0.410 | 0.120 | 0.470 | 0 | Cannot Be Measured Due to Insufficient Sintering | | | |
| 35 | 0.410 | 0.120 | 0.470 | 0.005 | 33.2 | 35000 | −16.5 | −15.8 |
| 36 | 0.410 | 0.120 | 0.470 | 0.01 | 35.4 | 46200 | −0.5 | −0.7 |
| 37 | 0.410 | 0.120 | 0.470 | 0.02 | 37.6 | 52000 | −0.6 | −0.8 |
| 38 | 0.410 | 0.120 | 0.470 | 0.05 | 39.4 | 59500 | −0.5 | −0.8 |
| 39 | 0.410 | 0.120 | 0.470 | 0.07 | 38.2 | 53400 | −0.7 | −0.9 |
| 40 | 0.410 | 0.120 | 0.470 | 0.095 | 35.2 | 45200 | −0.8 | −1.1 |
| 41 | 0.410 | 0.120 | 0.470 | 0.1 | 34.8 | 44700 | −0.9 | −1.3 |

*1: Low Temperature Range τf = Temperature Coefficient of Resonant Frequency at −40° C. to 20° C. Based on Resonant Frequency at 20° C.
*2: Low Temperature Range τf = Temperature Coefficient of Resonant Frequency at 20° C. to 85° C. Based on Resonant Frequency at 20° C.

As shown in Table 1, in Samples No. 1, 11, 12, 22, 23, and 33 in which the molar ratios α, β, and γ do not satisfy any one of the expressions 0.240≤α≤0.470, 0.040≤β≤0.200, and 0.400≤γ≤0.650, the relative permittivity ∈r was out of the range of 35 to 45, or the Qf value was less than 45000. In addition, in Samples No. 1, 12, 22, and 33, the absolute values of the temperature coefficients τf of the resonant frequency in the low temperature range and the high temperature range were greater than 10 ppm/° C. In addition, in Sample No. 16 in which a Mn source was not added, the respective dielectric properties could not be measured due to insufficient sintering.

In addition, in Sample No. 35 in which the content of Mn in terms of MnO$_2$ was less than 0.01% by mass with respect to 100% by mass of the main component, the relative permittivity ∈r and the Qf value were small and the absolute values of the temperature coefficients τF of the resonant frequency were large. Therefore, the ceramic density was 5.13 g/cm$^3$ when measured according to JIS R1634-1998, and it was found that the structure was not sufficiently densified. In addition, in Sample No. 41 in which the content of Mn in terms of MnO$_2$ was 0.1% by mass with respect to 100% by mass of the main component, the relative permittivity ∈r was less than 35 and the Qf value was less than that of Sample No. 40.

On the other hand, in Samples No. 2 to 10, 13 to 21, 24 to 32, and 36 to 40 in which the molar ratios α, β, and γ satisfy the expressions of 0.240≤α≤0.470, 0.040≤β≤0.200, 0.400≤γ≤0.650, and α+β+γ=1; and the content of Mn in terms of MnO$_2$ is greater than or equal to 0.01% by mass and less than 0.1% by mass with respect to 100% by mass of the main component, the relative permittivity ∈r was 35 to 45, the Qf value was higher than or equal to 45000, and the absolute values of the temperature coefficients τf of the resonant frequency in the low temperature range and the high temperature range were less than or equal to 10 ppm/° C., and it was found that a dielectric ceramic having satisfactory dielectric properties can be provided.

In addition, in Samples No. 5 to 8, 16 to 19, 25 to 30, and 37 to 39, in which the molar ratios α, β, and γ satisfy the expressions of 0.300≤α≤0.440, 0.080≤β≤0.150, 0.420≤γ≤0.600, and α+β+γ=1; and the content of Mn in terms of MnO$_2$ is greater than or equal to 0.02% by mass and less than or equal to 0.07% by mass with respect to 100% by mass of the main component, the relative permittivity ∈r was 36.5 to 43, the Qf value was higher than or equal to 50000, and the absolute values of the temperature coefficients τf of the resonant frequency in the low temperature range and the high temperature range were less than or equal to 6 ppm/° C., and it was found that a dielectric ceramic having more satisfactory dielectric properties can be provided.

It was found from the above results that when a dielectric filter includes the dielectric ceramic according to the embodiment, the high-reliability dielectric filter, which is capable of stably maintaining satisfactory performance for a long period of time even in a place where an ambient temperature difference is great, can be provided.

Example 2

Next, the Qf value of a case in which a Mn source was added after calcination was compared to that of a casein which a Mn source was added before calcination. Samples No. 42 to 46 of the dielectric ceramic were obtained with the same manufacturing method as that of Example 1, except that manganese carbonate which was a Mn source was added after calcination. The values in the item "Quality Coefficient Qf of Addition before Calcination" of Table 2 were the Qf values of Samples No. 36 to 40 of Example 1, and the molar ratios of the main component and the content in terms of $MnO_2$ of Samples No. 42 to 46 were the same as those of Samples No. 36 to 40.

The Qf values of Samples No. 42 to 46 were measured with the same method as that of Example 1, the values thereof are shown in the item "Quality Coefficient Qf of Addition after Calcination". The improvement ratio of the quality coefficient Qf value due to the addition after calcination was calculated by dividing the difference between the quality coefficient Qf value of the addition before calcination and the quality coefficient Qf value of the addition after calcination by the quality coefficient Qf value of the addition before calcination; and multiplying the obtained value by 100. The results are shown in Table 2.

TABLE 2

| Sample No. | Content of $MnO_2$ % by Mass | Quality Coefficient Qf of Addition Before Calcination | Quality Coefficient Qf of Addition After Calcination | Improvement Ratio % of Qf Value Due to Addition After Calcination |
|---|---|---|---|---|
| 42 | 0.010 | 46200 | 48500 | 5.0 |
| 43 | 0.020 | 52000 | 54700 | 5.2 |

TABLE 2-continued

| Sample No. | Content of $MnO_2$ % by Mass | Quality Coefficient Qf of Addition Before Calcination | Quality Coefficient Qf of Addition After Calcination | Improvement Ratio % of Qf Value Due to Addition After Calcination |
|---|---|---|---|---|
| 44 | 0.050 | 59500 | 62600 | 5.2 |
| 45 | 0.070 | 53400 | 56100 | 5.1 |
| 46 | 0.095 | 45200 | 47400 | 4.9 |

It was found from Table 2 that the Qf value can be improved by adding a Mn source after calcination. In addition, it was confirmed that $Mn_{0.33}Zr_{0.33}Ti_{0.33}O_{1.67}$ was present with a method in which a surface of each of Samples No. 42 to 46 of the dielectric ceramic was irradiated with CuKα rays using an X-ray diffractometer (D8 ADVANCE, manufactured by Bruker AXS Inc.); an angle difference (2θ) between a diffraction direction and an incident direction of the CuKα rays and an X-ray diffraction chart, which was a result of scanning an X-ray diffraction intensity with a detector, were obtained; and the identification was performed based on the JCPDS card. As a result, it was found that a dielectric ceramic having an improved Qf value can be provided when the compound formed of oxides containing Mn, Zr, and Ti is present in the grain boundary.

Example 3

Next, the starting materials were weighed such that the molar ratios of the main component and the content in terms of $MnO_2$ were the same as those of Sample No. 38 of Example 1. Then, the respective powders of silicon oxide ($SiO_2$), niobium oxide ($Nb_2O_5$), zinc oxide (ZnO), and copper oxide (CuO) were added to the starting materials such that the contents thereof in the obtained dielectric ceramic with respect to 100% by mass of the main component were as shown in Table 3. As a result, a primary raw material was prepared. Next, Samples No. 47 to 53 of the dielectric ceramic were obtained with the same method as that of Example 1.

Regarding the obtained samples, the contents with respect to 100% by mass of the main component, the relative permittivity ∈r, the Qf value, and the temperature coefficients τf in the low temperature range and the high temperature range were obtained with the same method as that of Example 1 using an ICP emission spectrophotometric analyzer, respectively. The results thereof are shown in Table 3. For comparison, the dielectric properties and the like of Sample No. 38 of Example 1 are shown together.

TABLE 3

| Sample No. | $SiO_2$ % by Mass | $Nb_2O_5$ % by Mass | ZnO % by Mass | CuO % by Mass | Total Content % by Mass | Relative Permittivity ∈r | Quality Coefficient Qf | Low Temperature Range τf ppm/° C. | High Temperature Range τf ppm/° C. |
|---|---|---|---|---|---|---|---|---|---|
| 38 | 0 | 0 | 0 | 0 | 0 | 39.4 | 59500 | −0.50 | −0.73 |
| 47 | 0.005 | 0.005 | 0.005 | 0.005 | 0.02 | 39.4 | 59500 | −0.49 | −0.58 |
| 48 | 0.010 | 0.010 | 0.010 | 0.010 | 0.04 | 39.4 | 59600 | −0.48 | −0.55 |
| 49 | 0.020 | 0.020 | 0.020 | 0.020 | 0.08 | 39.5 | 59500 | −0.46 | −0.51 |
| 50 | 0.025 | 0.025 | 0.025 | 0.025 | 0.10 | 39.5 | 59200 | −0.44 | −0.48 |
| 51 | 0.050 | 0.050 | 0.050 | 0.050 | 0.20 | 39.5 | 59100 | −0.38 | −0.40 |
| 52 | 0.075 | 0.075 | 0.075 | 0.075 | 0.30 | 39.6 | 58500 | −0.30 | −0.32 |
| 53 | 0.100 | 0.100 | 0.100 | 0.100 | 0.40 | 39.7 | 55100 | −0.23 | −0.25 |

It was found from Table 3 that the difference between the temperature coefficients τf of the resonant frequency in the low temperature range and the high temperature range can be reduced when the dielectric ceramic includes oxides of Si, Nb, Zn, and Cu. In particular, it was found that, when the total content of Si, Nb, Zn, and Cu in terms of $SiO_2$, $Nb_2O_5$, ZnO, and CuO is less than or equal to 0.3% by mass (not including 0% by mass) with respect to 100% by mass of the main component, a dielectric ceramic can be provided which has a small amount of deterioration in Qf value and a small difference between the temperature coefficients τf of the resonant frequency in the low temperature range and the high temperature range.

Example 4

Next, the starting materials were weighed and prepared such that the molar ratios of the main component and the content in terms of $MnO_2$ were the same as those of Sample No. 16 of Example 1, and the same processes as that of the method of Example 1 were performed until molding. These compacts were heated to 1450° C. at various temperature rise rates shown in Table 4, followed by being left to stand and firing for 2 hours. As a result, Samples No. 54 to 59 of the dielectric ceramic were obtained.

Regarding the obtained samples, the Qf value (before moisture absorption) was measured with the same method as that of Example 1; and after the samples after measurement were left to stand in a sealed container having a humidity of 80% for 12 hours or longer, the Qf value (after moisture absorption) was measured with the same method as that of Example 1. A difference between the Qf value before moisture absorption and the Qf value after moisture absorption was calculated, this difference was divided by the Qf value before the moisture absorption and was multiplied by 100, thereby obtaining the change ratio of the Qf value of each sample. In addition, the ceramic density was measured according to JIS R1634-1998. The results thereof are shown in Table 4.

TABLE 4

| Sample No. | Temperature Rise Rate ° C./Hr | Density g/cm³ | Change Ratio of Qf Value % |
| --- | --- | --- | --- |
| 54 | 160 | 5.15 | 8.5 |
| 55 | 150 | 5.16 | 5.0 |
| 56 | 120 | 5.18 | 3.5 |
| 57 | 100 | 5.19 | 1.0 |
| 58 | 80 | 5.20 | 0.8 |
| 59 | 50 | 5.21 | 0.5 |

It was found from Table 4 that, when the temperature rise rate during firing is less than or equal to 150° C./hr, the ceramic density can be made to be greater than or equal to 5.16 g/cm³. In addition, it was found that, when the ceramic density is greater than or equal to 5.16 g/cm³, the change ratio of the Qf value before and after moisture absorption can be reduced.

Example 5

Next, the starting materials were weighed such that the molar ratios of the main component and the content in terms of $MnO_2$ were the same as those of Sample No. 16 of Example 1. Then, powder of diphosphorus pentaoxide ($P_2O_5$) was added to the starting materials such that the content thereof in the obtained dielectric ceramic with respect to 100% by mass of the main component was as shown in Table 5. As a result, a primary raw material was prepared. Next, for each of Samples No. 60 to 67 of the dielectric ceramic, five specimens were prepared with the same method as that of Example 1, except that the shape of a compact was formed into the specimen configuration according to JIS R 1601-1995.

For each sample, the three-point bending strength was measured according to JIS R 1601-1995, and the average value of five values of the three-point bending strength for each sample was calculated. In addition, the content with respect to 100% by mass of the main component was obtained with the same method as that of Example 1 using an ICP emission spectrophotometric analyzer. The results thereof are shown in Table 5.

TABLE 5

| Sample No. | Content of $P_2O_5$ % by Mass | Three-Point Bending Strength MPa |
| --- | --- | --- |
| 60 | 0 | 150 |
| 61 | 0.01 | 162 |
| 62 | 0.05 | 173 |
| 63 | 0.10 | 185 |
| 64 | 0.30 | 195 |
| 65 | 0.50 | 181 |
| 66 | 0.70 | 172 |
| 67 | 0.75 | 155 |

It was found from Table 5 that, when the content of P in terms of $P_2O_5$ is less than or equal to 0.7% by mass (not including 0% by mass) with respect to 100% by mass of the main component, the three-point bending strength can be made to be greater than or equal to 160 MPa, and thereby improving mechanical properties.

Example 6

Next, the starting materials were weighed such that the molar ratios of the main component and the content in terms of $MnO_2$ were the same as those of Sample No. 38 of Example 1. Then, the respective powders of molybdenum oxide ($MoO_3$), yttrium oxide ($Y_2O_3$), and bismuth oxide ($Bi_2O_3$) were added to the starting materials such that the contents thereof in the obtained dielectric ceramic with respect to 100% by mass of the main component were as shown in Table 6. As a result, a primary raw material was prepared. Next, Samples No. 68 to 89 of the dielectric ceramic were obtained with the same method as that of Example 1.

Regarding the obtained samples, the contents with respect to 100% by mass of the main component were obtained using an ICP (Inductively Coupled Plasma) emission spectrophotometric analyzer with the same method as that of Example 1. In addition, the Qf value was obtained with the same method as that of Example 1. Furthermore, the improvement ratio of the Qf value was calculated by dividing the difference between each Qf value of Example 6 and the Qf value of Sample No. 38 of Example 1 by the Qf value of Sample No. 38; and multiplying the obtained value by 100. The results are shown in Table 6. For comparison, the dielectric properties and the like of Sample No. 38 of Example 1 are shown together.

TABLE 6

| Sample No. | MoO$_3$ % by Mass | Y$_2$O$_3$ % by Mass | Bi$_2$O$_3$ % by Mass | Total Content % by Mass | Quality Coefficient Qf | Qf Improvement Ratio % |
|---|---|---|---|---|---|---|
| 38 | 0 | 0 | 0 | 0 | 59500 | 0 |
| 68 | 0.050 | 0 | 0 | 0.050 | 61500 | 3.4 |
| 69 | 0.100 | 0 | 0 | 0.100 | 62100 | 4.4 |
| 70 | 0.150 | 0 | 0 | 0.150 | 60100 | 1.0 |
| 71 | 0 | 0.050 | 0 | 0.050 | 61800 | 3.9 |
| 72 | 0 | 0.100 | 0 | 0.100 | 62100 | 4.4 |
| 73 | 0 | 0.150 | 0 | 0.150 | 61000 | 2.5 |
| 74 | 0 | 0 | 0.050 | 0.050 | 61600 | 3.5 |
| 75 | 0 | 0 | 0.100 | 0.100 | 62400 | 4.9 |
| 76 | 0 | 0 | 0.150 | 0.150 | 60500 | 1.7 |
| 77 | 0.050 | 0.050 | 0 | 0.100 | 63500 | 6.7 |
| 78 | 0.050 | 0 | 0.050 | 0.100 | 64200 | 7.9 |
| 79 | 0 | 0.050 | 0.050 | 0.100 | 64500 | 8.4 |
| 80 | 0.050 | 0.100 | 0 | 0.150 | 60400 | 1.5 |
| 81 | 0.050 | 0 | 0.100 | 0.150 | 60800 | 2.2 |
| 82 | 0 | 0.050 | 0.100 | 0.150 | 60600 | 1.8 |
| 83 | 0.001 | 0.001 | 0.001 | 0.003 | 61300 | 3.0 |
| 84 | 0.040 | 0.040 | 0.020 | 0.010 | 62300 | 4.7 |
| 85 | 0.010 | 0.010 | 0.005 | 0.025 | 63200 | 6.2 |
| 86 | 0.020 | 0.020 | 0.010 | 0.050 | 63800 | 7.2 |
| 87 | 0.025 | 0.025 | 0.025 | 0.075 | 63900 | 7.4 |
| 88 | 0.040 | 0.040 | 0.020 | 0.100 | 62900 | 5.7 |
| 89 | 0.050 | 0.050 | 0.050 | 0.150 | 59600 | 0.2 |

It was found from Table 6 that the Qf value can be improved when the dielectric ceramic includes at least one of oxides of Mo, Y, and Bi. In particular, it was found that, when the total content of Mo, Y, and Bi in terms of MoO$_3$, Y$_2$O$_3$, and Bi$_2$O$_3$ is less than or equal to 0.1% by mass (not including 0% by mass) with respect to 100% by mass of the main component, the Qf value can be improved by 3% or higher.

Example 7

Next, the starting materials were weighed and prepared such that the molar ratios of the main component and the content in terms of MnO$_2$ were the same as those of Sample No. 38 of Example 1, and the same processes as that of the method of Example 1 were performed until the drying of the primary raw material. The dried powder of the primary raw material was calcined at a calcination temperature shown in Table 7. After calcination, Samples No. 90 to 92 of the dielectric ceramic were obtained with the same method as that of Example 1.

In addition, whether or not a crystal phase of Ti$_{0.8}$Sn$_{0.2}$O$_2$ was present in the obtained samples was determined with a method in which a surface of each of Samples No. 42 to 46 of the dielectric ceramic was irradiated with CuKα rays using an X-ray diffractometer (D8 ADVANCE, manufactured by Bruker AXS Inc.); an angle difference (2θ) between a diffraction direction and an incident direction of the CuKα rays and an X-ray diffraction chart, which was a result of scanning an X-ray diffraction intensity with a detector, were obtained; and the identification was performed based on the JCPDS card. In addition, the relative permittivity ∈r was obtained with the same method as that of Example 1. The results are shown in Table 7. For comparison, the dielectric properties and the like of Sample No. 38 of Example 1 are shown together.

TABLE 7

| Sample No. | Calcination Temperature °C. | Crystal Phase of Ti$_{0.8}$Sn$_{0.2}$O$_2$ | Relative Permittivity ∈r |
|---|---|---|---|
| 38 | 1200 | None | 39.4 |
| 90 | 1180 | None | 39.2 |
| 91 | 1150 | Present | 42.1 |
| 92 | 1100 | Present | 42.5 |

It was found from Table 7 that the relative permittivity is improved when the dielectric ceramic includes a crystal phase of Ti$_{0.8}$Sn$_{0.2}$O$_2$.

REFERENCE SIGNS LIST

1: Dielectric filter
2: Metal case
3: Input terminal
4: Output terminal
5: Ceramic body
6: Placing table

The invention claimed is:

1. A dielectric ceramic, comprising:
a main component, molar ratios α, β, and γ satisfying the following expressions when a composition formula of the main component is represented as αZrO$_2$·βSnO$_2$·γTiO$_2$:

$0.240 \leq \alpha \leq 0.470$ $0.040 \leq \beta \leq 0.200$ $0.400 \leq \gamma \leq 0.650$ $\alpha+\beta+\gamma=1$;

Mn, a content of Mn in terms of MnO$_2$ being greater than or equal to 0.01% by mass and less than 0.1% by mass with respect to 100% by mass of the main component; and
oxides of Si, Nb, Zn, and Cu,
wherein a total content of Si, Nb, Zn, and Cu in terms of SiO$_2$, Nb$_2$O$_5$, ZnO, and CuO is less than or equal to 0.3% by mass but not including 0% by mass with respect to 100% by mass of the main component.

2. The dielectric ceramic according to claim 1, wherein the molar ratios α, β, and γ of the composition formula satisfy the following expressions:

$$0.300 \leq \alpha \leq 0.440$$

$$0.080 \leq \beta \leq 0.150$$

$$0.420 \leq \gamma \leq 0.600$$

$$\alpha+\beta+\gamma=1, \text{ and}$$

a content of Mn in terms of $MnO_2$ is greater than or equal to 0.02% by mass and less than or equal to 0.07% by mass with respect to 100% by mass of the main component.

3. The dielectric ceramic according to claim 1, wherein a compound formed of oxides containing Mn, Zr, and Ti is present in its grain boundary.

4. The dielectric ceramic according claim 1, wherein a ceramic density is greater than or equal to 5.16 g/cm$^3$.

5. The dielectric ceramic according to claim 1, wherein a content of P in terms of $P_2O_5$ is less than or equal to 0.7% by mass but not including 0% by mass with respect to 100% by mass of the main component.

6. The dielectric ceramic according to claim 1, further comprising:
at least one of oxides of Mo, Y, and Bi,
wherein a total content of Mo, Y, and Bi in terms of $MoO_3$, $Y_2O_3$, and $Bi_2O_3$ is less than or equal to 0.1% by mass but not including 0% by mass with respect to 100% by mass of the main component.

7. The dielectric ceramic according to claim 1, further comprising:
a crystal phase of $Ti_{0.8}Sn_{0.2}O_2$.

8. A dielectric filter, comprising:
the dielectric ceramic according to claim 1;
an input terminal that is electromagnetically coupled with the dielectric ceramic and to which an electric signal is inputted from outside; and
an output terminal that is electromagnetically coupled with the dielectric ceramic and from which an electric signal corresponding to a resonant frequency of the dielectric ceramic is selectively outputted.

9. A dielectric ceramic, comprising: a main component, molar ratios α, β, and γ satisfying the following expressions when a composition formula of the main component is represented as $\alpha ZrO_2 \cdot \beta SnO_2 \cdot \gamma TiO_2$:

$$0.240 \leq \alpha \leq 0.470$$

$$0.040 \leq \beta \leq 0.200$$

$$0.400 \leq \gamma \leq 0.650$$

$$\alpha+\beta+\gamma=1;$$

Mn, a content of Mn in terms of $MnO_2$ being greater than or equal to 0.01% by mass and less than 0.1% by mass with respect to 100% by mass of the main component,
wherein a content of P in terms of $P_2O_5$ being less than or equal to 0.7% by mass but not including 0% by mass with respect to 100% by mass of the main component.

10. A dielectric ceramic, comprising:
a main component, molar ratios α, β, and γ satisfying the following expressions when a composition formula of the main component is represented as $\alpha ZrO_2 \cdot \beta SnO_2 \cdot \gamma TiO_2$:

$$0.240 \leq \alpha \leq 0.470$$

$$0.040 \leq \beta \leq 0.200$$

$$0.400 \leq \gamma \leq 0.650$$

$$\alpha+\beta+\gamma=1;$$

Mn, a content of Mn in terms of $MnO_2$ being greater than or equal to 0.01% by mass and less than 0.1% by mass with respect to 100% by mass of the main component; and
at least one of oxides of Mo, Y, and Bi,
wherein a total content of Mo, Y, and Bi in terms of $MoO_3$, $Y_2O_3$, and $Bi_2O_3$ being less than or equal to 0.1% by mass but not including 0% by mass with respect to 100% by mass of the main component.

* * * * *